E. B. PEIRCE.
TRUCK AND WHEELBARROW.
APPLICATION FILED SEPT. 23, 1916.

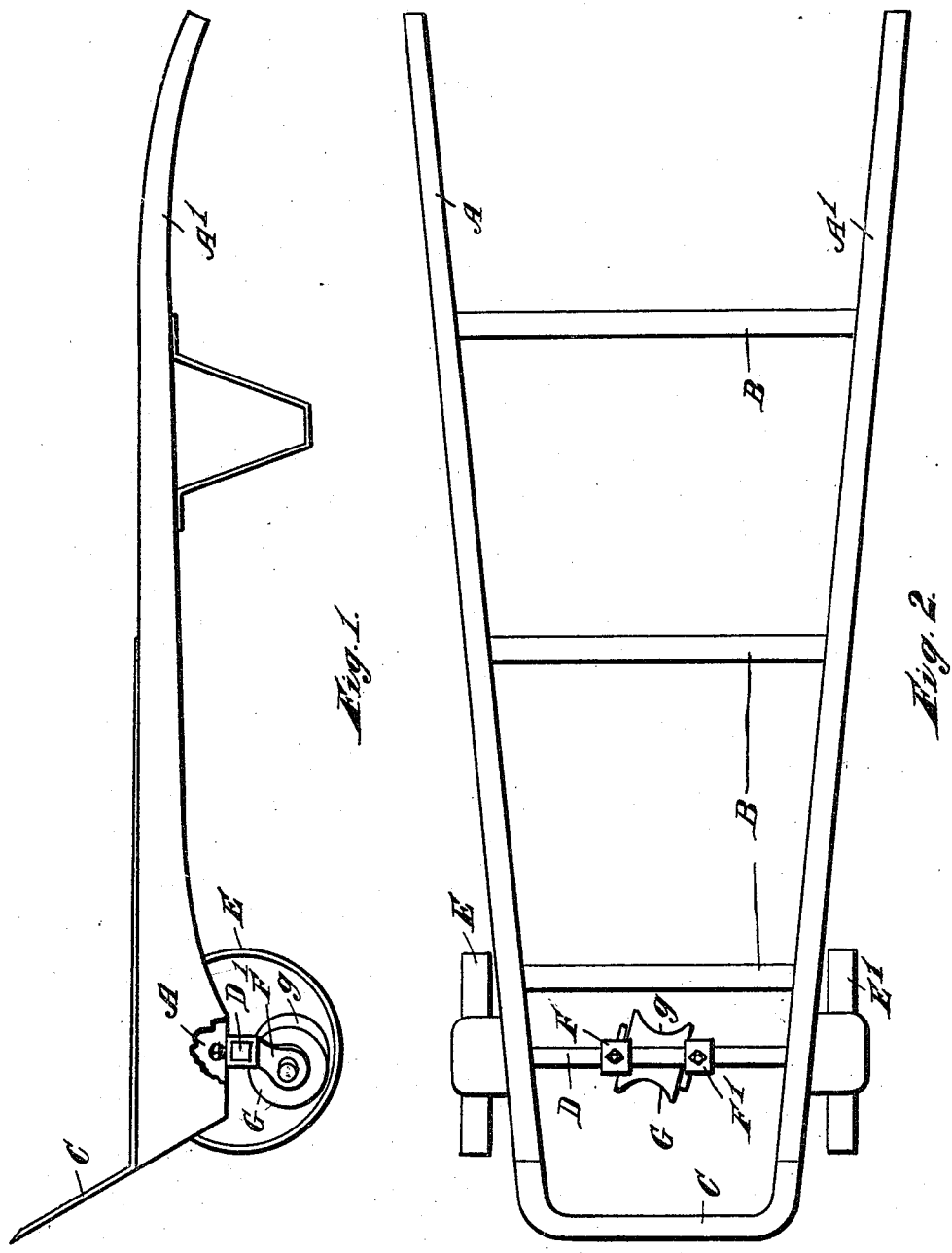

1,230,769.

Patented June 19, 1917.
4 SHEETS—SHEET 2.

WITNESS:
Sudger A. Nicol
Henry A. Prescott.

INVENTOR
Edward B. Peirce,
BY Albert M. Moore,
His ATTORNEY.

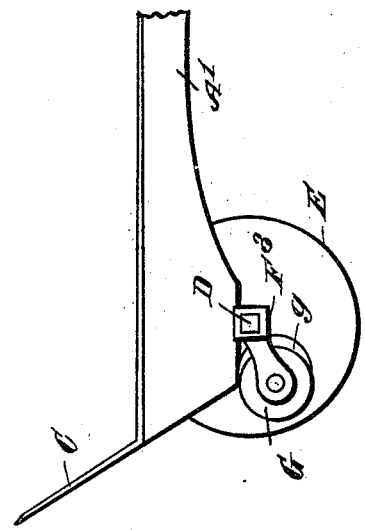
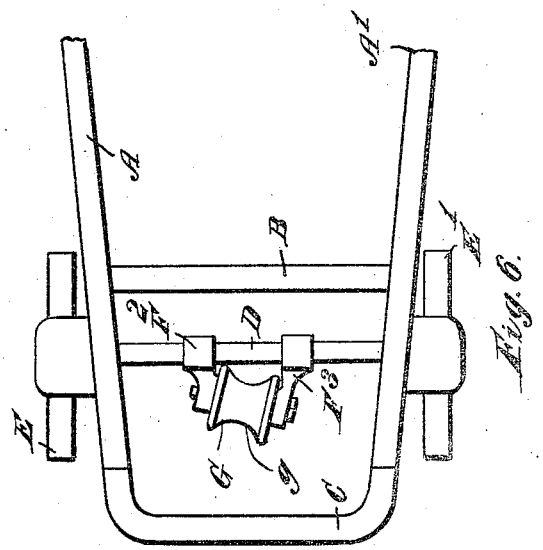
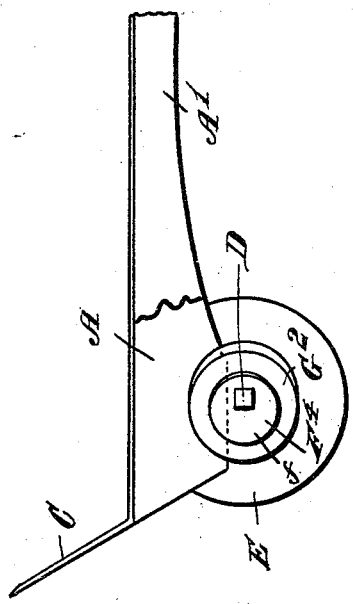
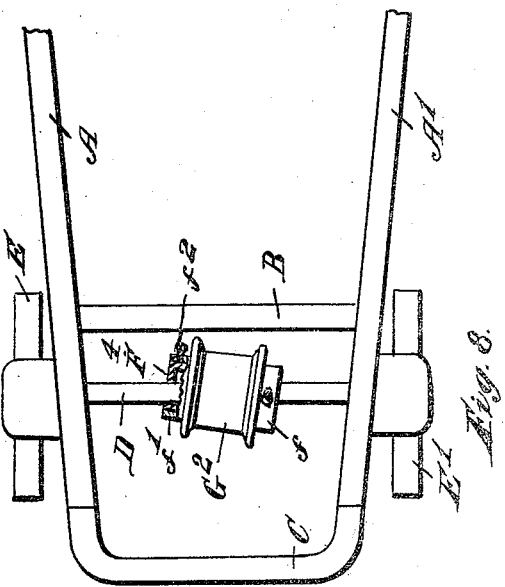

E. B. PEIRCE.
TRUCK AND WHEELBARROW.
APPLICATION FILED SEPT. 23, 1916.

1,230,769.

Patented June 19, 1917.
4 SHEETS—SHEET 4.

WITNESS:
Ludger A. Nicol.
Henry A. Prescott.

INVENTOR:
Edward B. Peirce,
BY Albert M. Moore,
His ATTORNEY.

UNITED STATES PATENT OFFICE.

EDWARD B. PEIRCE, OF LOWELL, MASSACHUSETTS.

TRUCK AND WHEELBARROW.

1,230,769.  Specification of Letters Patent.  Patented June 19, 1917.

Application filed September 23, 1916. Serial No. 121,871.

*To all whom it may concern:*

Be it known that I, EDWARD B. PEIRCE, a citizen of the United States, residing at Lowell, in the county of Middlesex and Commonwealth of Massachusetts, have invented a certain new and useful Improvement in Trucks and Wheelbarrows, of which the following is a specification.

This invention relates to trucks and wheelbarrows of the kinds that are provided with two wheels on the same axle and with handles, by which said trucks and wheelbarrows are propelled, such as railroad and warehouse trucks and all such trucks and barrows as are used in railway stations for moving baggage or in freight depots for transporting freight and in mines or railway yards where rails are laid for cars.

The object of the invention is to enable the truck or barrow to be propelled not only on a platform or on the ground in the usual manner but to be run on the smooth surface of a track rail where such is available rather than on rough, sandy, soft or muddy ground and at the same time to permit the man who is propelling the same to walk alongside of the track and not astride the rail.

I accomplish this by using a third or supplementary wheel supported at or near the middle of the axle of the barrow or truck and provided with flanges, to retain said third wheel on the rail.

This supplementary wheel is arranged at such an angle to the median line of the truck or barrow as, when on the track rail, to throw the handles entirely beyond the rail.

The supplementary wheel is arranged between the ordinary supporting wheels and does not reach as low as the latter so that said supplementary wheel does not touch the platform or ground when the truck or barrow is used in the usual manner and does not interfere with the customary use of the truck or barrow. When the truck or barrow is used on a rail the side wheels reaching down below the head of the rail (but not to the ground) on each side of the rail, limit the lateral inclination of said truck or barrow and render it less liable to be overturned.

Figure 3:
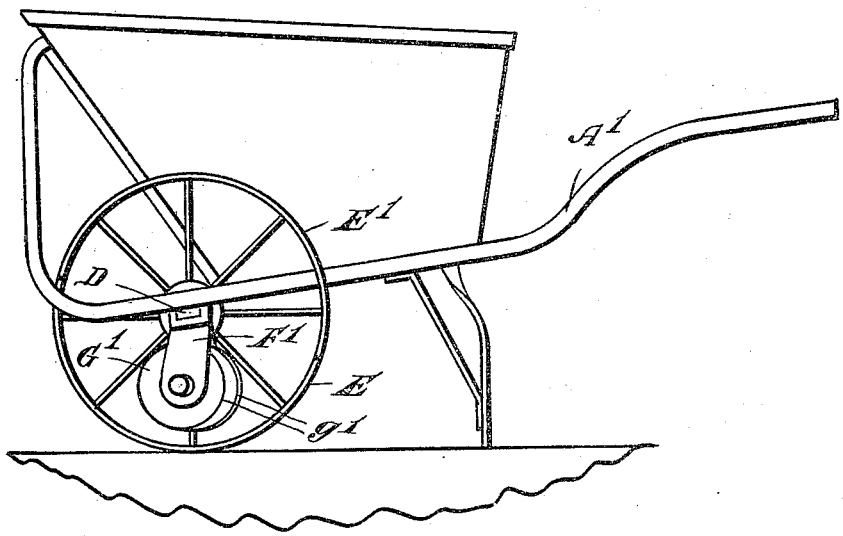
Figure 4:
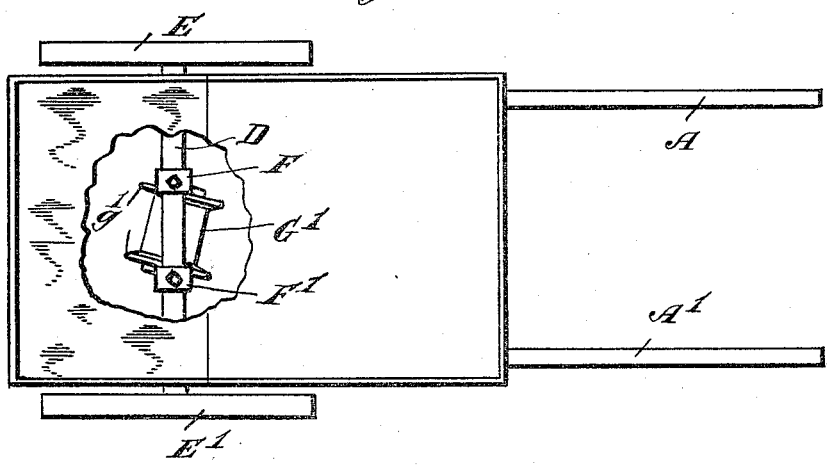
Figure 9:
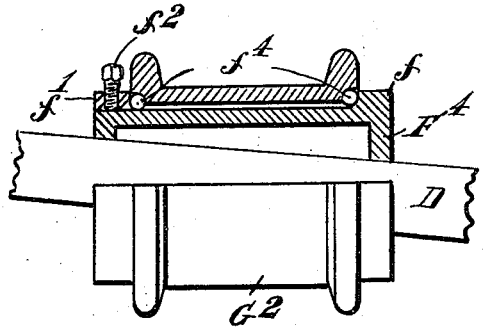
Figure 10:
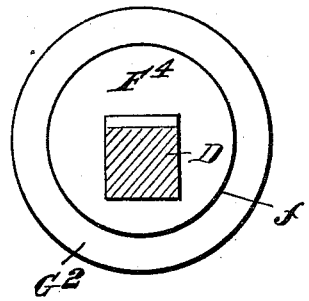
Figure 11:
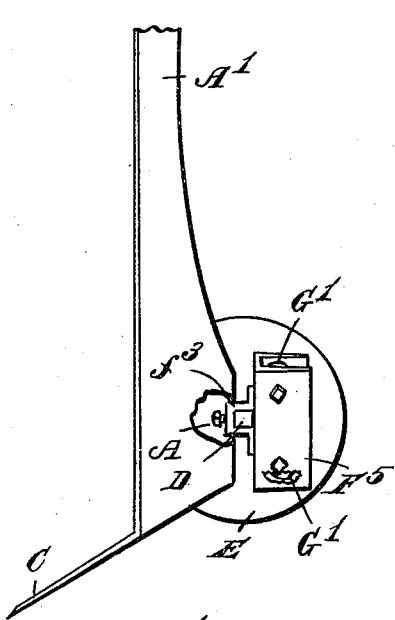
Figure 12:
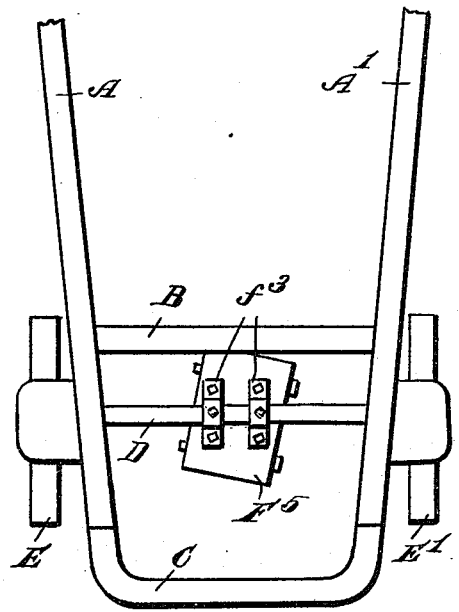

In the accompanying drawing, Figure 1 is a side elevation of a truck embodying the preferred form of my invention; Fig. 2, a plan of the same; Fig. 3, a side elevation of a barrow provided with said improvement; Fig. 4, a plan of the same with a part of the bottom removed, to show the supplementary wheel; Fig. 5, a side elevation of a truck showing the supplementary wheel slightly in advance of the main axle; Fig. 6, a plan of the same; Fig. 7, a side elevation of a modification in which the supplementary wheel revolves on a sleeve secured on the main axle at an angle therewith; Fig. 8, a plan of the same; Fig. 9, an enlarged front elevation of the axle, sleeve and pulley shown in Figs. 7 and 8, the upper part of the sleeve and pulley being in central longitudinal section; Fig. 10, a side elevation of said sleeve and pulley, showing the axle in section; Figs. 11 and 12, respectively a side elevation and a plan of a modification of the truck in which two supplementary wheels are used, the truck being in a standing position.

The trucks shown are of ordinary construction, except as hereinafter stated, each consisting of handles A A$^1$ which are of sufficient length to form from the sides of the truck, cross-bars B B B, nose C, axle D, on which the wheels E E$^1$, in the customary use of the truck, revolve.

In all the trucks the supports or hangers of the supplementary wheels are represented as secured on the non-rotary axles at about equal distance from the wheels E E$^1$.

In Figs. 1 and 2 the hangers F F$^1$ are or may be precisely alike but are represented as so placed on the axle D that the free end of one is in the rear of the axle and the other in front of the axle so that the axis of the supplementary wheel G is at an angle with said axle.

The wheel G is provided with a circumferential groove $g$ to receive and run on a rail. No part of the supplementary wheel in these Figs. 1 and 2 or in the forms shown in the other figures extends beyond the curved surface of an imaginary cylinder of which the outer faces of the supporting wheels E E$^1$ form the ends so that the supplementary wheel is out of contact with the surface on which the wheels E E$^1$ rest when the latter are in use. The supplementary wheel is supported in the hangers F F$^1$ and rotates freely between them when the truck is running on a rail.

The barrow shown in Figs. 3 and 4 is of any usual construction in other respects but is provided with supporting wheels and handles which are in function like those in the other figures and are therefore indicated by the same letters of reference. The supplementary wheel G¹ serves the same purpose, and is supported in a similar manner, by hangers F F¹, as the supplementary wheel shown in Figs. 1 and 2 but differs from that wheel in being wider and substantially cylindrical between the flanges g¹ g¹ to enable the barrow to be used on a temporary rail or timber of rectangular section.

In Figs. 5 and 6, the hangers F² F³ differ from those shown in Figs. 1 and 2 in the respect that they both project forward, one being longer than the other so that the axis of the wheel G (which is like the wheel G in the last named figures) is at an angle with the axle but farther in front of the center of gravity of the truck and load.

In Figs. 7, 8, 9 and 10 the supplementary wheel G² is externally of the shape shown in Figs. 3 and 4 but turns upon a sleeve F⁴ which is stationary upon the axle and is arranged at an angle therewith, said sleeve having at one end a flange $f$ and at the other a collar $f^1$ retained on said sleeve by a set-screw $f^2$ between which flange and collar said wheel is retained on said sleeve. Antifriction balls $f^4$ are interposed between the sleeve F⁴ and the wheel G².

In Figs. 11 and 12 a plurality of wheels (two being indicated) like those shown in Figs. 3 and 4 are journaled in a frame F⁵ secured by straps $f^3$ to the axle. Using a plurality of wheels tends to prevent the rocking of the truck or barrow and assists in guiding the same.

In all cases the supplementary or track wheel or wheels are arranged at an angle to the median line of the truck or barrow.

I claim as my invention:—

1. The combination of a truck or barrow having two side wheels parallel with the median line thereof, of a supplementary wheel arranged between said side wheels and at an angle with said median line and provided with a circumferential groove to receive a rail.

2. The combination in a truck or the like of an axle, side wheels parallel with the median line thereof, a supplementary axle, hangers supported on said first named axle and supporting said supplementary axle at an angle with said median line and a grooved wheel supported on said supplementary axle.

In witness whereof I have signed this specification in the presence of two subscribing witnesses.

EDWARD B. PEIRCE.

Witnesses:
ALBERT M. MOORE,
WILLIAM F. CURTIN.

Copies of this patent may be obtained for five cents each, by addressing the "Commissioner of Patents, Washington, D. C."